United States Patent [19]
Pariseau et al.

[11] Patent Number: 5,947,540
[45] Date of Patent: Sep. 7, 1999

[54] TAILGATE ASSEMBLY

[75] Inventors: Dave Pariseau, Grass Lake; Edgar George Trudeau, Bloomfield Hills; Muhammad Saleem; Harvinder Sethi, both of Inkster, all of Mich.

[73] Assignee: Ford Motor Company, Dearborn, Mich.

[21] Appl. No.: 09/097,328

[22] Filed: Jun. 15, 1998

[51] Int. Cl.[6] .................................................. B62D 25/00
[52] U.S. Cl. ........................... 296/57.1; 296/50; 296/901; 296/146.6
[58] Field of Search ........................... 296/57.1, 50, 901, 296/146.6; 292/DIG. 29, 337, 346, 40

[56] References Cited

U.S. PATENT DOCUMENTS

| | | | |
|---|---|---|---|
| 2,955,863 | 10/1960 | Olender | 292/DIG. 29 |
| 4,358,158 | 11/1982 | Nash | 292/DIG. 29 |
| 5,056,861 | 10/1991 | Garnweidner et al. | 296/146.6 |
| 5,286,080 | 2/1994 | Ringdal et al. | 296/901 |
| 5,451,089 | 9/1995 | Bender | 296/57.1 |
| 5,707,095 | 1/1998 | Pribak et al. | 296/57.1 |
| 5,714,039 | 2/1998 | Habdas | 296/57.1 |

*Primary Examiner*—Joseph D. Pape
*Assistant Examiner*—Kiran Patel
*Attorney, Agent, or Firm*—Damian Porcari

[57] ABSTRACT

A vehicle tailgate assembly having a transverse beam placed between the inner and outer surfaces of a tailgate. The transverse beam transfers a load placed on the tailgate to side plates secured to the transverse beam. The side plates transfer the load to cables that are attached between the side plates and the pickup sides. The transverse beam is generally positioned at the top of the tailgate. Box-like sections were added to the lower portion of the tailgate aligned between the pivot hinges. The box-like sections are formed into the tailgate by joining the inner and outer walls of the tailgate.

12 Claims, 7 Drawing Sheets

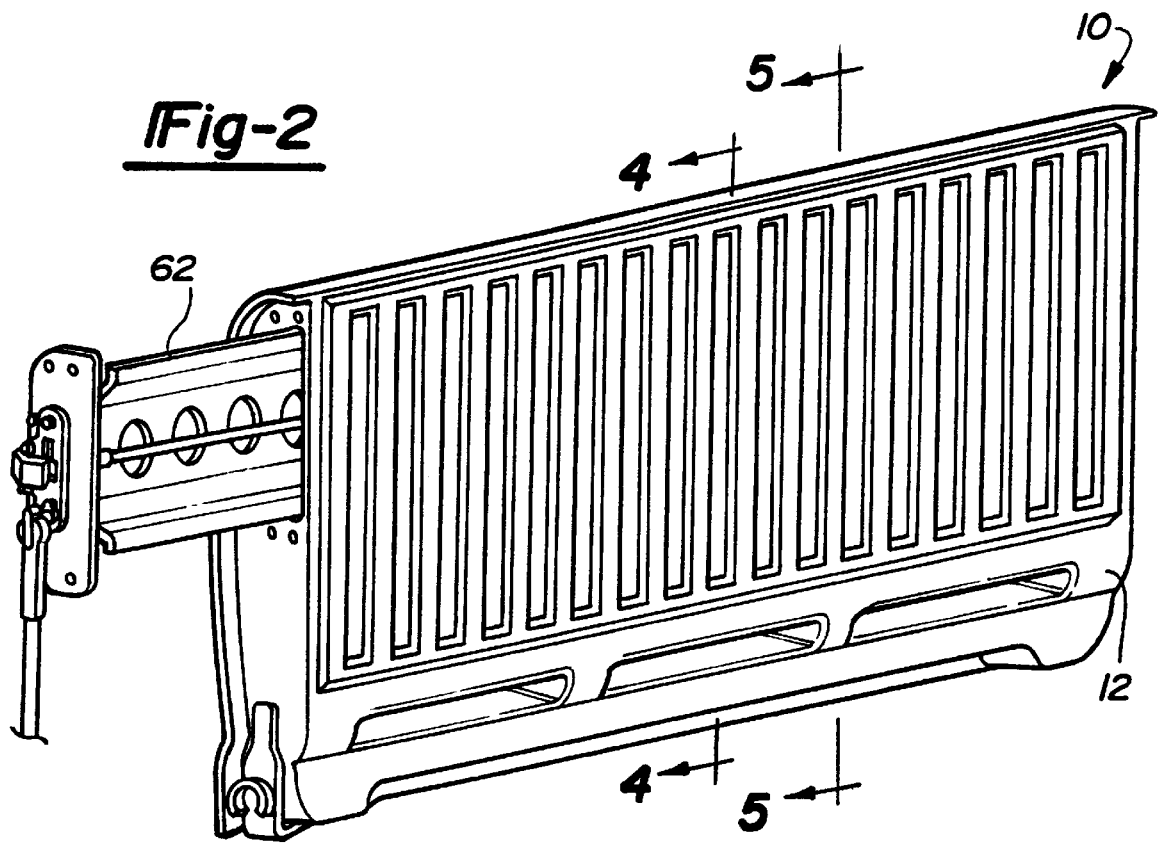
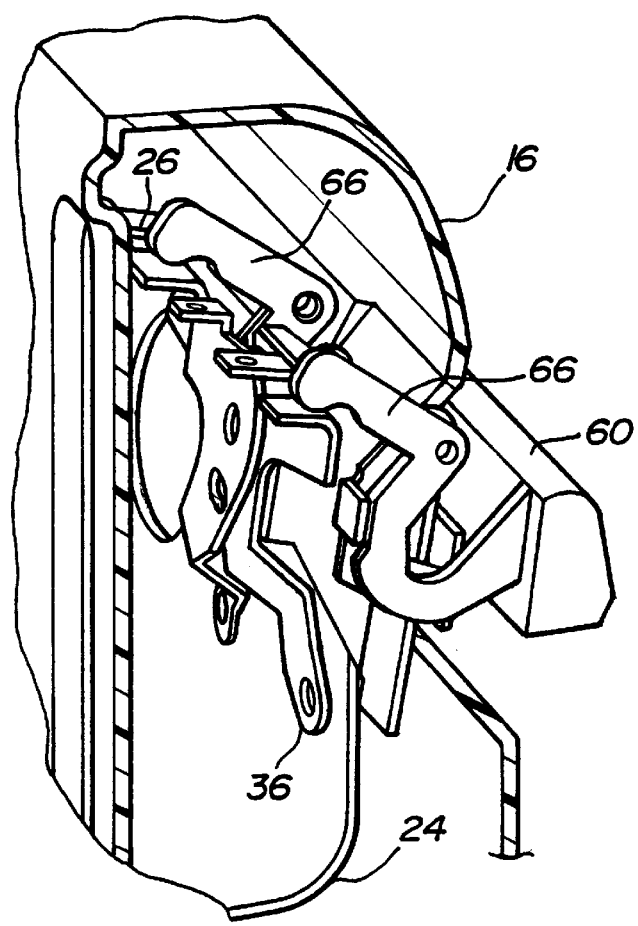

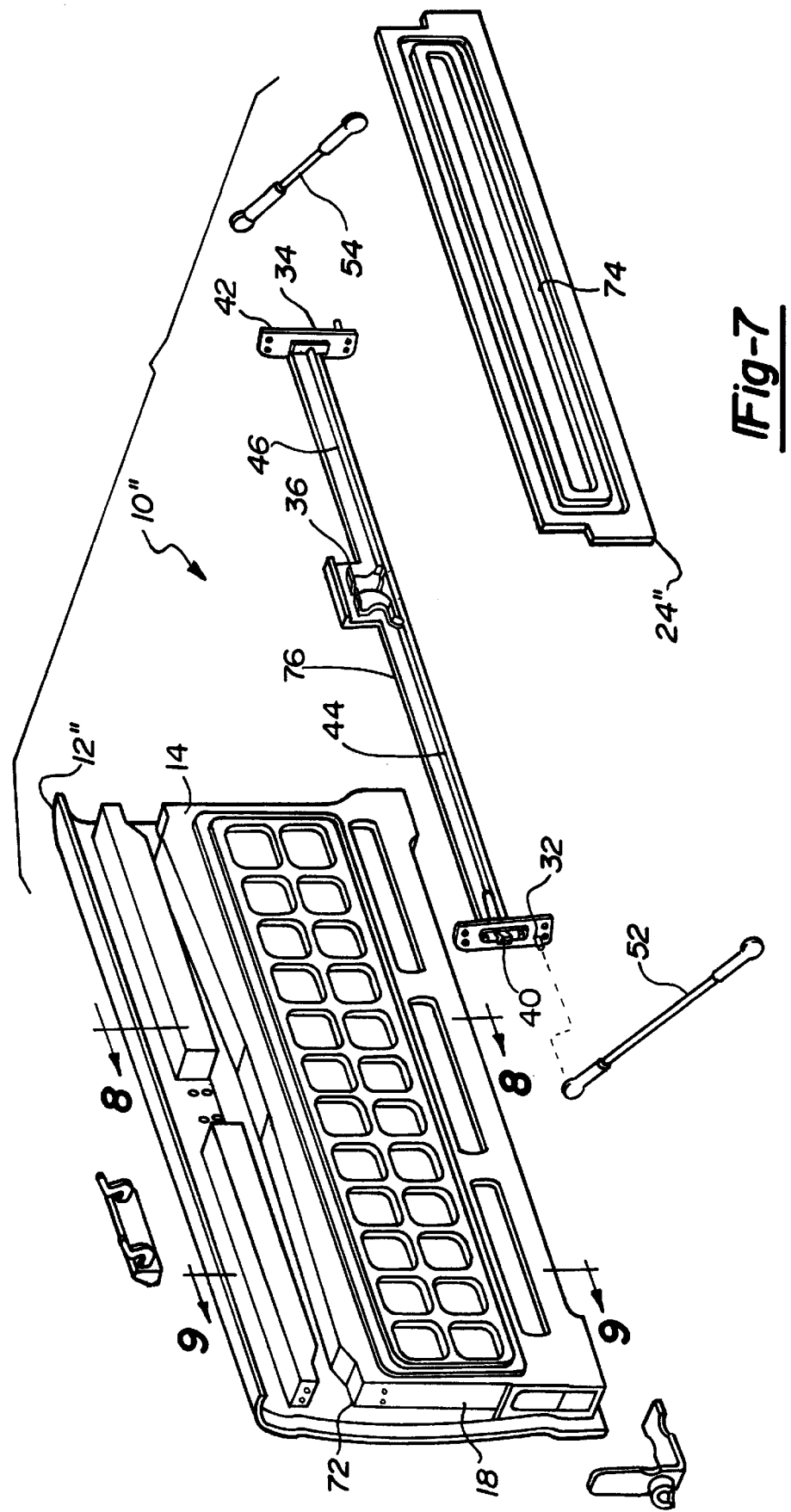

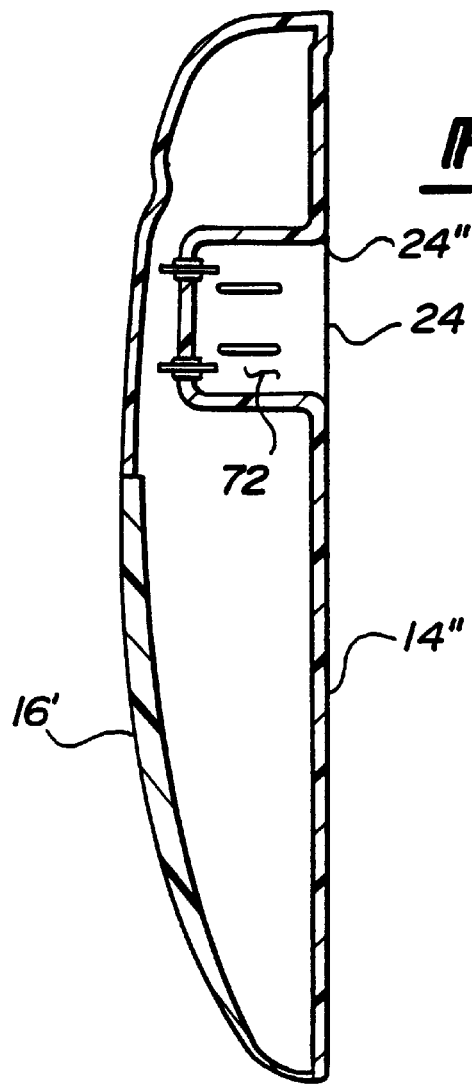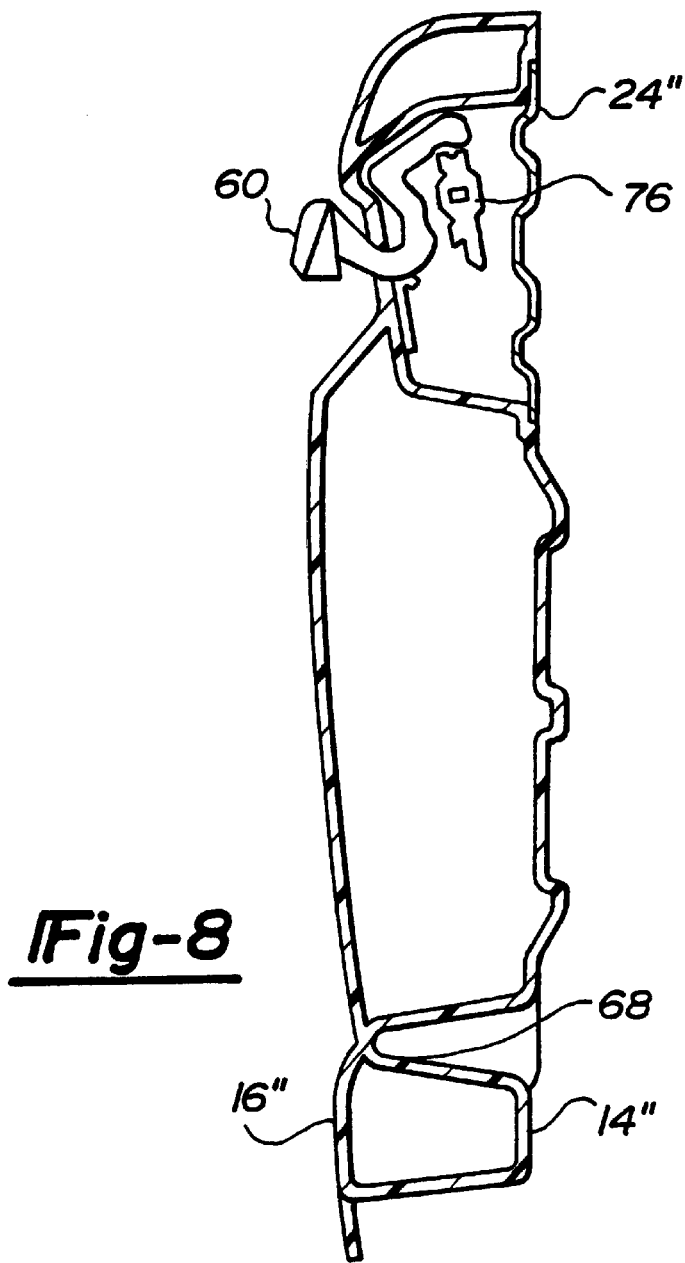

TAILGATE ASSEMBLY

BACKGROUND OF THE INVENTION

1. Field of the Invention

The present invention is directed to a tailgate assembly for a motor vehicle. More specifically, the present invention is directed to a tailgate assembly utilizing a plastic tailgate and a steel cross member.

2. Background of the Invention

The pick-up truck is among the most popular vehicle sold. It includes a cabin, a bed section for carrying cargo and a swinging tailgate to retain cargo in the bed. The tailgate is made from stamped steel and pivots about a pivot point. When the tailgate is in a lowered position, it acts as a loading platform for the bed. In the raised position, the tailgate closes the pickup bed.

Conventional tailgate assemblies are made from stamped metal panels welded together to form a tailgate. Latches are added on either side of the tailgate to engage a striker on the pickup sides. A handle operates the latches to open and close the tailgate assembly. Steel tailgate assemblies provide a durable and secure closure for the pickup bed.

One disadvantage with steel tailgate assemblies is the weight of the metal components. A typical compact truck tailgate weighs between 30 and 35 pounds. It is desirable to provide a tailgate assembly that is lighter than a steel tailgate assembly to reduce the overall weight of the vehicle.

Another disadvantage of steel tailgate assemblies is the cost of the tooling required and equipment required to stamp metal tailgate components. Metal tailgate components are generally produced in a large stamping press. The stamping presses generally require finely machined tools made from hardened steel. The cost of tooling a metal tailgate is much more expensive than tooling a plastic tailgate.

Another disadvantage of existing tailgate designs involves the way in which they are assembled. As described, the tailgate assembly comprises a steel tailgate made from inner and outer panels, two latches, a handle and interconnecting hardware. The latches, handle and hardware are hand fitted within the openings of the tailgate. It is desirable to provide a simple method of assembling the tailgate where the closure hardware is pre-assembled outside of the tailgate and then fitted into the tailgate as a single drop-in assembly.

Heretofore, it has generally been assumed that tailgates needed to be made from steel to provide the durability and surface finish desired by today's consumers. Because the tailgate assembly is used as a loading platform when in the lowered position, it must be strong enough to support 500 pounds. Merely substituting plastic components for the steel inner and outer panels of existing tailgate designs do not provide sufficient strength to meet this load requirement. The present invention is directed to providing a tailgate design that meets this load-carrying requirement.

Advances in materials, paints and molding techniques enable the manufacture of a tailgate that meets the surface finish requirements of a vehicle class A exterior surface. The materials make a molded tailgate visually indistinguishable from a painted steel tailgate.

These and other disadvantages of the prior art are overcome by the present invention.

SUMMARY OF THE INVENTION

The present invention utilizes a transverse beam placed between the inner and outer surfaces of a tailgate. The transverse beam transfers a load placed on the tailgate to side plates secured to the transverse beam. The side plates transfer the load to cables that are attached between the side plates and the pickup bed sides.

The invention may be utilized with a blow-molded tailgate by forming the tailgate to have a hollow portion between the inner and outer surfaces of the tailgate. Apertures on either side of the tailgate receive the transverse beam. The transverse beam is inserted within the hollow portion. The side plates close the apertures and secure the transverse beam to the tailgate.

The invention may also be utilized with an injection-molded tailgate made from separate inner and outer panels. The transverse beam is placed between the inner and outer panels to reinforce the tailgate. The inner and outer panels are brought together and bonded to form the tailgate.

The transverse beam is generally positioned at the top of the tailgate. This area of the tailgate was found to be the weakest area and the area that received the greatest load. Box-like sections were added to the lower portion of the tailgate and aligned between the pivot hinges. These box-like sections strengthen the tailgate in the vicinity of the pivot hinges. The box-like sections are formed into the tailgate by joining the inner and outer walls of the tailgate. When the tailgate is constructed by blow-molding, the inner and outer walls are pinched together to fuse. The fused wall sections form an integral wall having box-like reinforcements extending transversely across the tailgate. Injection molded tailgates may be constructed to have a similar structure. The inner and outer walls may be joined by suitable means such as adhesives and welding.

In an alternative embodiment of the present invention, the transverse beam is mounted within a channel formed into the inner surface of the tailgate. In this embodiment, the beam is exposed to the pickup bed and not contained between the inner and outer walls of the tailgate. This further facilitates assembly of the tailgate assembly.

Common to all of these described tailgate designs, is a transverse beam that includes the closure hardware. The closure hardware is assembled and carried by the traverse beam. In this way the transverse beam and closure hardware are attached to the tailgate in the final assembly process by simply inserting the transverse beam into a slot, aperture or channel. This assembly process is especially convenient when the tailgate is manufactured in an unpainted state. The closure hardware may be easily removed for painted and later replaced. This reduces the internal cost of the finished tailgate assemblies.

These and other objects, features, and advantages of the present invention will become more readily apparent when viewed in connection with the accompanying drawing wherein like reference numerals correspond to like components.

BRIEF DESCRIPTION OF THE DRAWINGS

FIG. 2 is a perspective view of the tailgate assembly illustrating the transverse beam being inserted into the tailgate.

FIG. 3 is a perspective view, partially broken away, of the handle area.

FIG. 7 is an exploded perspective view of yet another alternative embodiment utilizing a transverse beam attached within a slot in a tailgate.

FIG. 8 is a cross-sectional view taken along the lines 8—8 of FIG. 7.

FIG. 9 is a cross-sectional view taken along the lines of 9—9 of FIG. 7.

DETAILED DESCRIPTION OF THE PREFERRED EMBODIMENT

Figure 1:
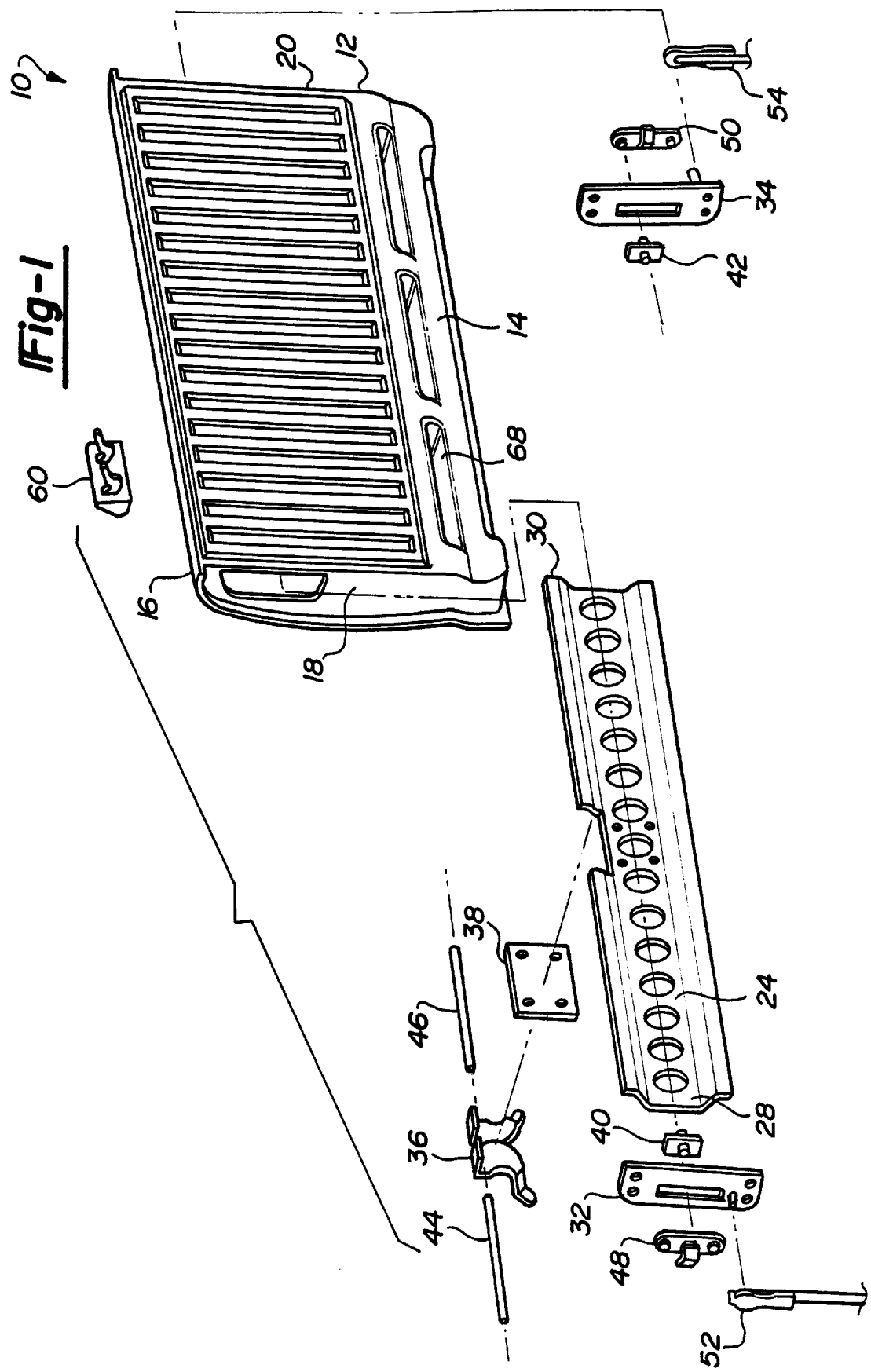
FIG. 1 is an exploded perspective view of a tailgate assembly.

The present invention will be described through a series of drawings, which illustrate the tailgate assembly claimed. The drawings include several embodiments of blow-molded and injection molded tailgates. While the invention is particularly well adapted to plastic tailgates, it may also be utilized in the manufacture of steel, aluminum or other metal tailgates. These and other designs may be manufactured using the same or similar construction and are included within the invention described herein.

The following items are a word list of the items described in the drawings and are reproduced to aid in understanding the invention;

10, 10', 10" tailgate assembly
12, 12', 12" molded tailgate
14, 14' inner wall
16, 16' outer wall
18, 20 side wall
22 aperture
24, 24', 24" transverse beam
26 mid portion
28, 28', 30, 30' side portion
32, 32', 34, 34' side plate
36 lever assembly
38 reinforcement plate
40, 42 latch
44, 46 rod
48, 50 cable pin
52, 54 cable
56, 56', 58, 58' pivot hinge
60 handle
62, 62' dressed assembly
64 flange portion
66 arms
68 box section
70 pickup bed
72 channel
74 planer surface
76 closure assembly Illustrated in FIGS. 1–3 is a tailgate assembly 10 made from a blow-molded tailgate 12. The tailgate 12 is manufactured using conventional blow-molding equipment. A plastic parison forms the walls of the tailgate 12. The blow-molded tailgate 12 includes an inner wall 14 that faces the bed portion of a pickup when the tailgate assembly 10 is installed on a vehicle and the tailgate assembly 10 is in the raised position. The inner wall 14 acts as a loading platform when the tailgate assembly 10 is in a lowered position. The blow-molded tailgate 12 includes an outer wall that faces away from the pickup bed. Suitable blow-molding materials include xenoy. The tailgate 12 includes side walls 18, 20. Side walls 18, 20 join inner and outer walls 14, 16. An aperture 22 in the side wall 18 receives a transverse beam. As will be more fully described below, an aperture (not shown) opposite aperture 22 enables the transverse beam to pass through a hollow portion in the tailgate 12.

A U-shaped transverse beam 24 strengthens the tailgate assembly 10. The transverse beam 24 includes a mid portion 26 and side portions 28, 30. The side portions 28, 30 receive side plates 32, 34. The side plates 32, 34 are secured to the side portions 28, 30 and strengthen the transverse beam 24. The mid portion 26 receives a lever assembly 36 and a reinforcement plate 38. Latches 40, 42 are attached to the side plates 32, 34. Connecting rods 44, 46 join the latches 40, 42 to the lever assembly 36. The side plates 32, 34 include cable pins 48, 50. The cable pins 48, 50 receive cables 52, 54.

The tailgate assembly 10 pivots about pivot hinges 56, 58. The pivot hinges 56, 58 are attached to the side walls 18, 20 by rivets or screws (not shown). After the transverse beam 24 is inserted into the tailgate 12, a handle 60 is attached through an aperture in the outer wall 16 as shown in FIG. 3 and is attached to the transverse beam 24.

In practice, the transverse beam 24 will be pre-assembled to include the latches 40, 42, the rods 44, 46, the side plates 32, 44 and the reinforcement plate 38 to form a dressed assembly 62 as shown in FIG. 2. The dressed assembly 62 may be easily inserted within the aperture 22 to complete the tailgate assembly 10.

Figure 4:
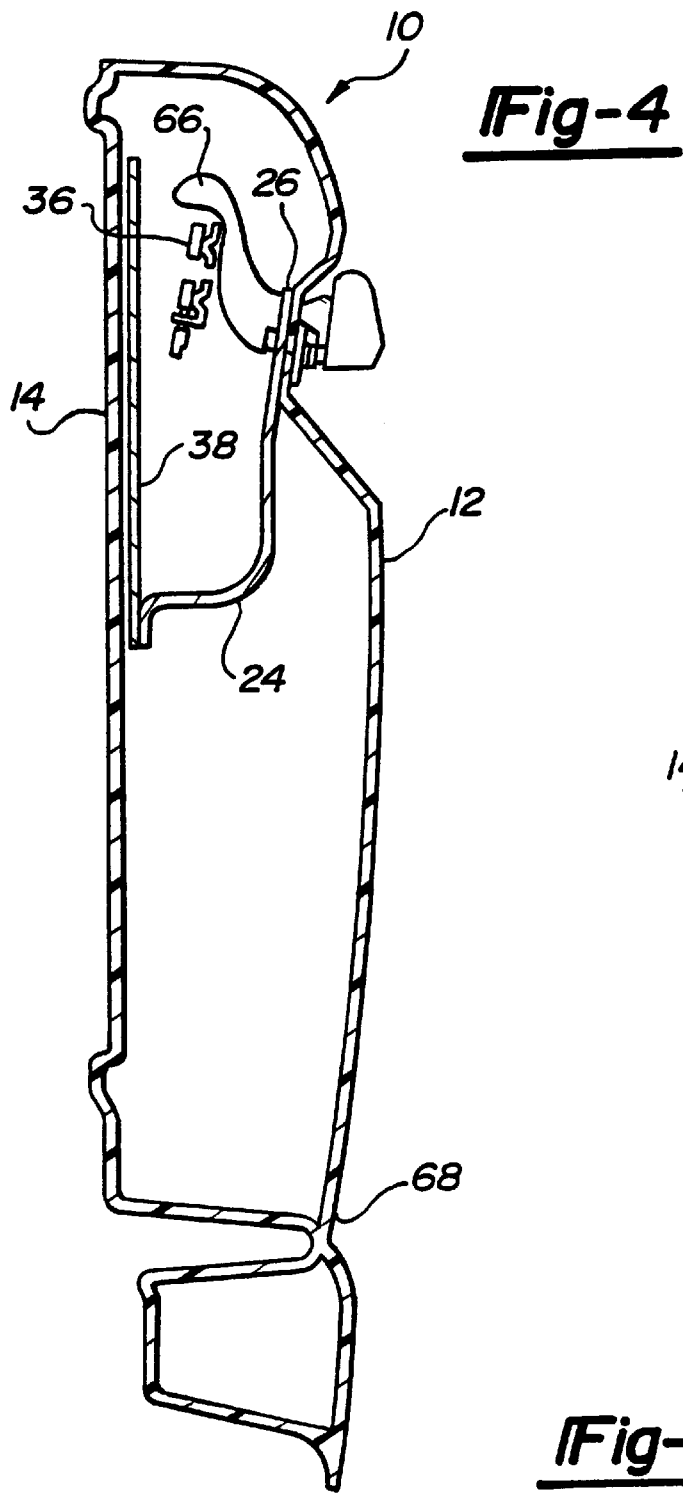
FIG. 4 is a cross-sectional view of the tailgate assembly illustrated in FIG. 2, taken along the lines 4—4, after the transverse beam is fully inserted into the tailgate.
Figure 5:
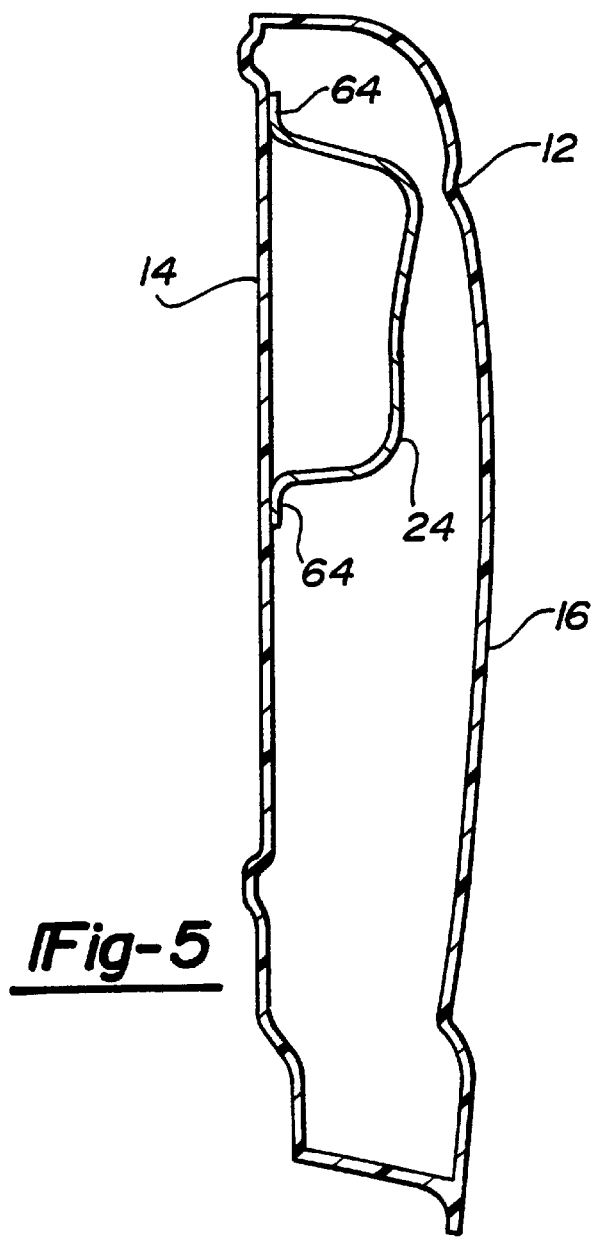
FIG. 5 is a cross-sectional view of the tailgate assembly illustrated in FIG. 2, taken along the lines 5—5, after the transverse beam is fully inserted into the tailgate.

FIGS. 4 and 5 illustrate cross-sectional views of the tailgate assembly 10 after the dressed assembly 62 is completely inserted within the tailgate 12. The reinforcement plate 38 is illustrated in FIG. 4 and flange portions 64 are illustrated in FIG. 5. The reinforcement plate 38 and the flange portions 64 contact and support the inner wall 14. The reinforcement plate 38 and the flange portions 64 act as a support surface for supporting weight placed on the tailgate. A force or load placed on inner wall 14 is directly transferred as a force through the plate 38 and flange 64 to the transverse beam 24.

The transverse beam 24 includes a cut-out mid portion 26. Illustrated in FIG. 3 is a detailed perspective view, partially broken away of the tailgate assembly 10 illustrating the mid portion 26, handle 60 and lever assembly 36. The handle 60 is inserted through an aperture in the outer wall 16. The mid portion 26 receives the handle 60 as shown in FIGS. 3 and 4. The handle 60 includes arms 66 that engage the lever assembly 36. Operating the handle 60 causes the arms 66 to engage the lever assembly 36 and release the latches 40, 42.

Also illustrated in FIG. 4 are reinforced box-sections 68. The reinforced box sections 68 are made by joining the inner wall 14 to the outer wall 16. In a blow-molded tailgate 12, the inner and outer walls 14, 16 are joined together in the mold. The inner and outer walls 14, 16 weld and fuse at the box section 68 to form an integral wall. The box sections 68 are positioned generally along the pivot axis of the tailgate assembly. A load placed on the inner wall 14 is transmitted either through the transverse beam 24 or through the box sections 68.

The transverse beam 24 is made into a U-shape as illustrated in FIG. 5. The flange portions 64 are spaced apart and support a large surface area of the inner wall 14. If a higher load bearing capability is required, the flange portions 64 may be widened or in-turned. Alternatively, the reinforcement plate 38 may be made to extend substantially across the length of the transverse beam 24.

Figure 6:
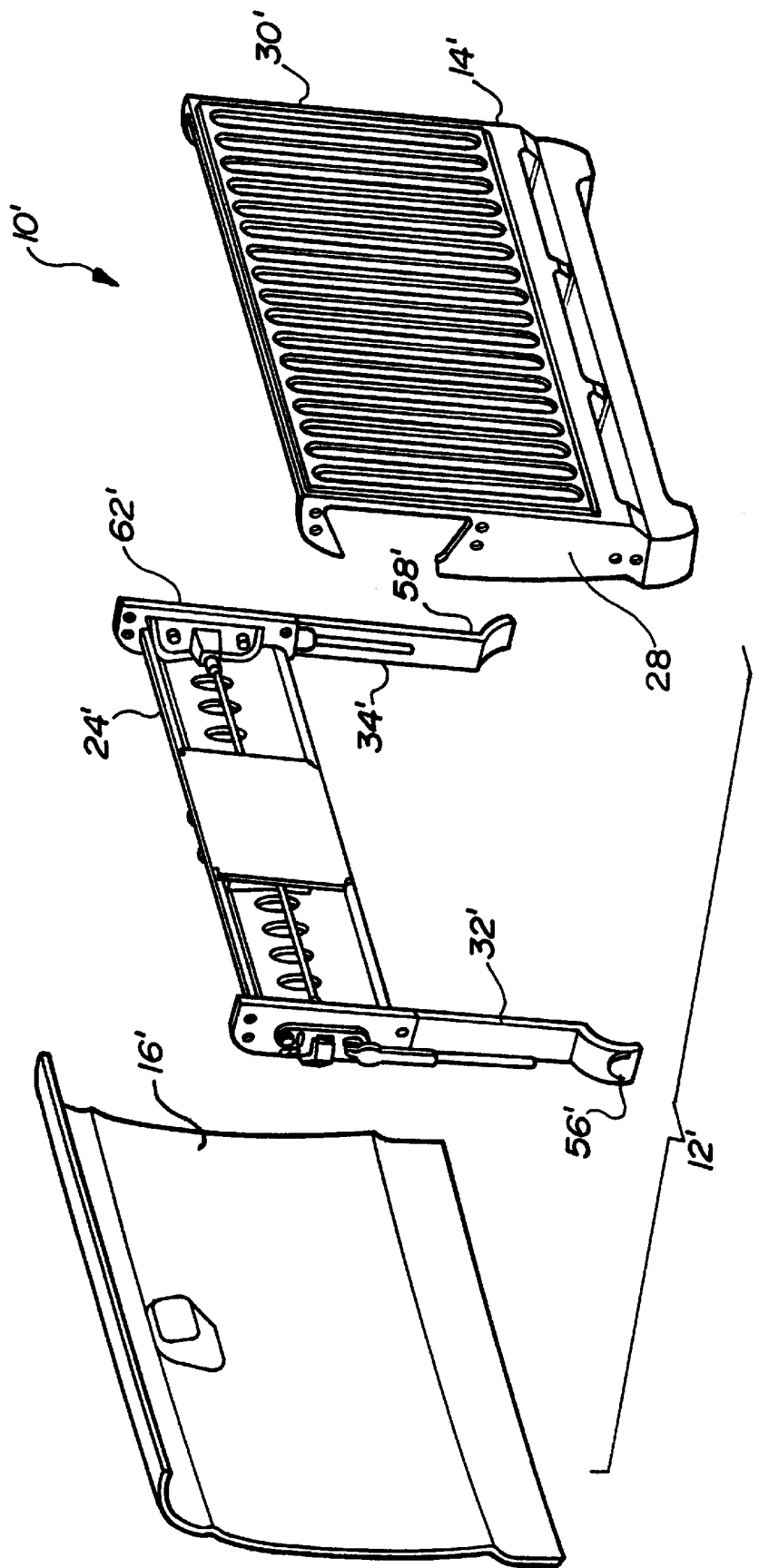
FIG. 6 is an exploded perspective view of an alternative embodiment of the present invention utilizing an injection molded tailgate.

Illustrated in FIG. 6 is an alternative embodiment of the present invention. The tailgate assembly 10' is constructed from an injection molded tailgate 12'. The tailgate 12' includes an inner wall 14' and an outer wall 16'. The inner wall 14' and the outer wall 16' are made in separate injection molding tools. The construction of the dressed assembly 62' is essentially as described above except that the side plates 32', 34' extend along the side portions 28', 30' and include integrally formed pivot hinges 56', 58'. A transverse beam 24' is enclosed between inner and outer walls 14', 16'. The inner and outer walls 14', 16' are joined by conventional means such as adhesives or plastic welding.

Illustrated in FIGS. 7–9 is yet another alternative embodiment of the present invention. A tailgate assembly 10" includes a blow-molded tailgate 12" having a transverse beam 24". The tailgate 12" is formed to have a transverse extending channel 72. The channel 72 receives the transverse beam 24". The transverse beam 24" has a planer surface 74 that lies substantially flush with the inner wall 14. The transverse beam 24" receives a closure assembly 76 that includes the lever assembly 36, connecting rods 44, 46, latches 40, 42 and side plates 32, 34. The closure assembly 76 is contained within the channel 72.

FIGS. 8 and 9 are detailed cross sectional views of the embodiment illustrated in FIG. 7. The closure assembly 76 is contained within the channel 72. The transverse beam 24" closes the channel 72. The box sections 68 are made by joining the inner and outer walls 14", 16". The remainder of the tailgate assembly 10" functions as described previously.

The present invention facilitates the manufacture of the dressed assembly 62 or a closure assembly 76 at a facility remote from the manufacture of the tailgate 12, 12', 12". This is especially useful because the transverse beam and closure components are generally made from metal components that are produced by a metal fabricating facility. The tailgate is manufactured from a plastic molded component, which is usually produced in a different facility. The dressed assembly may be quickly and simply inserted within the tailgate to produce a finished tailgate assembly. No special fixtures or jigs are needed. One side plate 34 is removed and the dressed assembly is inserted through the aperture 22. The side plate 34 is reattached and the pivot hinges 56, 58 secured to the sides 18, 20. The tailgate is generally painted prior to this final assembly.

Figure 10:
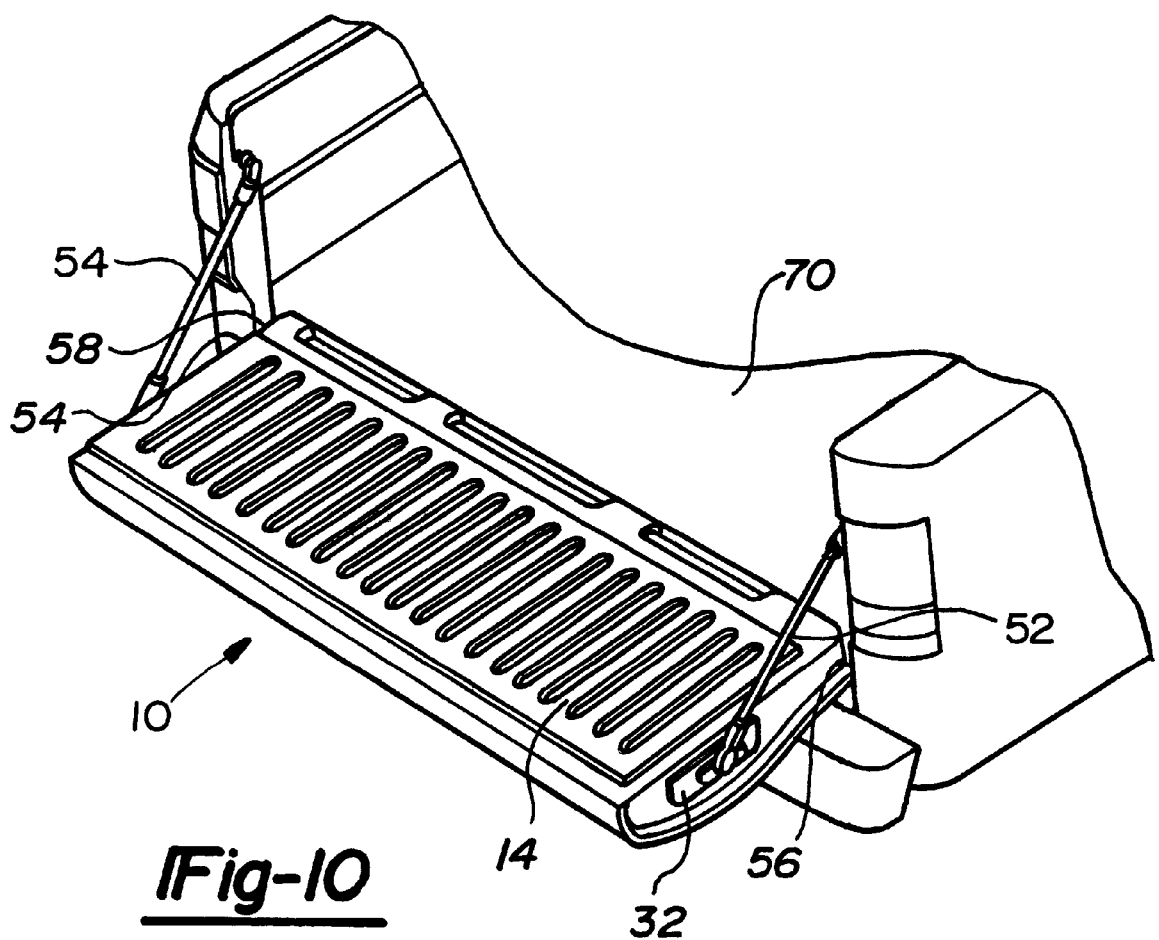
FIG. 10 is a perspective view of the tailgate assembly in the lowered position when installed on a vehicle pickup bed.

The tailgate assembly is designed to be interchangeable with a conventional steel tailgate. The first application for this design may be as a retrofit or replacement tailgate. The tailgate utilizes the same attachment and closure members so that no modifications are needed for the vehicle to accept the present tailgate assembly 10, 10', 10". The tailgate assembly 10, 10', 10" is designed to meet the Original Equipment Manufacturer (OEM) specifications for load carrying capability. Illustrated in FIG. 10 is the tailgate assembly 10 mounted to a vehicle pickup bed 70. The pivot hinges 56, 58 mate with pivot posts secured to the pickup bed (not shown). The cables 52, 54 attach to the pickup sides as shown. Weight placed on the inner wall 14 is transferred to the transverse beam 24 (not shown in this view) and then to side portions 28, 30 (not shown) and side plates 32, 34 (only side plate 32 is shown). The cables 52, 54 transfer the force to the pickup sides. Most of the force resulting from the weight placed on the tailgate assembly 10 is transferred through the cables 52, 54 and not through the pivot hinges 56, 58. In this way, even a relatively light-weight plastic tailgate may support a heavy cargo on the tailgate assembly 10.

While the best modes for carrying out the invention have been described in detail, those familiar with the art to which this invention relates will recognize various alternative designs and embodiments for practicing the invention as defined by the following claims.

What is claimed:

1. A cross-member assembly for use with a tailgate of a pickup bed comprising:

a rigid support beam extending transversely across said tailgate, said beam having a support surface for supporting weight placed on said tailgate, and said beam having two side portions on opposite ends of said beam;

a latch on each said side surface for engaging said tailgate to said pickup bed;

a cable pin on each said side surface for attaching a cable between said pickup bed and said cable pins; and a lever assembly communicating with said latches, said lever assembly receiving a handle and releasing said latches when said handle is operated.

2. The assembly of claim 1, wherein weight placed on said tailgate transfers a force through said support surface to said side portions, and then through said cable pins and cables to said pickup bed.

3. The assembly of claim 1, further comprising at least one removable side plate secured to one of said side portions to enable the cross-member assembly to be inserted through an aperture in said tailgate.

4. The assembly of claim 1, further comprising two side walls between said inner and outer walls and an aperture through at least one of said side walls, wherein at least one of said side plates covers the aperture.

5. The assembly of claim 1, wherein said lever assembly is attached to said beam.

6. A molded tailgate assembly for a pickup bed comprising;

a molded plastic tailgate having an inner wall and an outer wall, and side walls between said inner and outer walls, and an aperture through said side walls and extending transversely across said tailgate;

a rigid support beam within said aperture and extending transversely along said tailgate, said beam having a support surface for supporting weight placed on said tailgate and said beam having two side portions on either end of said beam;

a latch on each said side surface for engaging said tailgate to said pickup bed;

a cable pin on each said side surface for attaching a cable between said pickup bed and said cable pins;

a lever assembly communicating with said latches; and a handle attached to said lever assembly for releasing said latches when said handled is operated.

7. The molded tailgate assembly of claim 6, wherein said inner wall and said outer wall are joined together.

8. The molded tailgate assembly of claim 6, wherein said molded plastic tailgate has a hollow portion between said inner and outer walls and said transverse beam extends within said hollow portion.

9. The molded tailgate assembly of claim 6, further comprising a pivot hinge on each said side walls, said tailgate assembly pivoting about said pivot hinges.

10. The molded tailgate assembly of 6, wherein said lever assembly is attached to said beam.

11. The assembly of claim 6, wherein weight placed on said tailgate transfers a force through said support surface to said side portions, and then through said cable pins and cables to said pickup bed.

12. The assembly of claim 6, wherein said beam has a cut-out portion near said latch assembly to allow said handle to connect to said latch assembly, and further comprising a reinforcement plate spanning said cut-out portion to strengthen said beam.

* * * * *